(12) United States Patent
Kwon et al.

(10) Patent No.: US 8,055,385 B2
(45) Date of Patent: Nov. 8, 2011

(54) CONTROL SYSTEM, MOVING ROBOT APPARATUS HAVING THE CONTROL SYSTEM, AND A CONTROL METHOD THEREOF

(75) Inventors: Woong Kwon, Seongnam-si (KR); Kyung-shik Roh, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1325 days.

(21) Appl. No.: 11/625,986

(22) Filed: Jan. 23, 2007

(65) Prior Publication Data
US 2007/0255452 A1    Nov. 1, 2007

(30) Foreign Application Priority Data

Apr. 4, 2006    (KR) .......................... 10-2006-0030681

(51) Int. Cl.
*G05B 19/00*    (2006.01)
(52) U.S. Cl. ....................................... 700/258; 700/245
(58) Field of Classification Search .................. 33/356, 33/357, 361, 355 R; 324/244, 225, 207.12, 324/200, 202; 359/879; 701/92, 224, 245; 700/245, 258; 702/5
See application file for complete search history.

(56) References Cited

U.S. PATENT DOCUMENTS

| | | | | |
|---|---|---|---|---|
| 4,734,863 A | * | 3/1988 | Honey et al. | 701/207 |
| 5,774,632 A | * | 6/1998 | Kaske | 706/25 |
| 6,121,772 A | * | 9/2000 | Shih | 324/244 |
| 6,888,353 B1 | * | 5/2005 | Wiegert | 324/345 |
| 7,225,552 B2 | * | 6/2007 | Kwon et al. | 33/356 |

(Continued)

FOREIGN PATENT DOCUMENTS

KR    2005-44967    5/2005

(Continued)

OTHER PUBLICATIONS

Woong Kwon et al.: "Particle Filter-based Heading Estimation using Magnetic Compasses for Mobile Robot Navigation", 9 pp.

*Primary Examiner* — Khoi Tran
*Assistant Examiner* — Stephen Holwerda
(74) *Attorney, Agent, or Firm* — Stanzione & Kim, LLP

(57) ABSTRACT

A moving robot apparatus and a control system and method thereof. A current state variable (e.g., the current direction of the main body of the robot apparatus) may be estimated using current data output from a sensor part of the robot apparatus. Initially, it is determined whether the current data output from the sensor part satisfy a necessary condition. The necessary condition may be considered to be satisfied when the current data are unaffected by a disturbance or external interference (e.g., the earth's magnetic field.). Thereafter, a current sample value may be extracted from a previous sample value obtained from the sensor part. The previous sample value may relate to a previous state variable (e.g., a previous direction of the robot main body). A weight of the current data may be calculated based on the current sample value. A value of the weight may depend on whether the necessary condition is satisfied by the current data. The current state variable is then estimated based on the extracted current sample value and the calculated weight. A control of the directional movement of the robot main body may be provided based on the estimated current state variable. A control system may be provided to accurately estimate, using a probability distribution, the direction of the robot main body when it can not be determined whether or not an external disturbance is reflected in the data output from the sensor part.

24 Claims, 4 Drawing Sheets

U.S. PATENT DOCUMENTS

| | | | |
|---|---|---|---|
| 7,543,392 B2* | 6/2009 | Kwon et al. | 33/320 |
| 2003/0046021 A1* | 3/2003 | Lasky et al. | 702/150 |
| 2003/0167121 A1* | 9/2003 | Ockerse et al. | 701/224 |
| 2004/0020064 A1* | 2/2004 | Levi et al. | 33/319 |
| 2004/0123474 A1* | 7/2004 | Manfred et al. | 33/352 |
| 2004/0249504 A1* | 12/2004 | Gutmann et al. | 700/245 |
| 2005/0182518 A1 | 8/2005 | Karlsson | |
| 2005/0183275 A1* | 8/2005 | Kwon et al. | 33/361 |
| 2005/0251328 A1 | 11/2005 | Merwe et al. | |

FOREIGN PATENT DOCUMENTS

| | | |
|---|---|---|
| KR | 2005-79234 | 8/2005 |

* cited by examiner

CONTROL SYSTEM, MOVING ROBOT APPARATUS HAVING THE CONTROL SYSTEM, AND A CONTROL METHOD THEREOF

CROSS-REFERENCE TO RELATED APPLICATIONS

This application claims the benefit of Korean Patent Application No. 2006-0030681, filed on Apr. 4, 2006 with the Korean Intellectual Property Office, the disclosure of which is incorporated herein by reference in its entirety.

BACKGROUND OF THE INVENTION

1. Field of the Invention

The present general inventive concept relates to a control system, a moving robot apparatus having the control system, and a control method thereof, and more particularly, the present general inventive concept relates to a control system, which is capable of estimating control data for a moving robot using a sensor and based on a determination of whether a necessary condition is satisfied. The present general inventive concept also relates to a moving robot apparatus having this control system, and a control method thereof.

2. Description of the Related Art

A conventional moving robot apparatus having a control system for estimating optimal robot control data using a sensor that outputs data will be described with reference to FIG. 1.

FIG. 1 is a control block diagram of a conventional moving robot apparatus. As illustrated in FIG. 1, a moving robot apparatus comprises a robot main body 100, a sensor part 200, a data selecting part 300 and a filter part 400.

The sensor part 200 may comprise one or more sensors for sensing a direction of the robot main body 100, for example, an absolute direction of the robot main body with respect to the earth's magnetic field. Data output from the sensor part 200 (hereinafter referred to as 'sensing data') include external disturbances introduced from ambient environments during the sensing of the direction of the robot main body 100, and measurement errors produced while the sensing data are measured.

In general, a disturbance has a colored non-Gaussian distribution and a measurement error has a white Gaussian distribution. In particular, the disturbance may distort and invalidate the sensing data output from the sensor part 200.

The data selecting part 300 uses a predetermined rule to determine whether a disturbance contained in the sensing data output from the sensor part 200 can be ignored. If the sensing data satisfy the rule, the disturbance may be determined to be ignorable, and then the sensing data are output to the filter part 400.

The filter part 400, which may be embodied by a Kalman filter, accurately estimates the direction of the robot main body 100 by using the sensing data input from the data selecting part 300. The Kalman filter can calculate an optimal value (of direction estimation) when input sensing data have a Gaussian probability distribution.

However, if the rule used by the data selecting part 300 is inaccurate, sensing data having a non-Gaussian probability distribution may be input to the filter part 400. In other words, in spite of the fact that a disturbance cannot be ignored, the disturbance may still satisfy the rule and, hence, is input to the filter part 400, which may result in an undesirable result such as an erroneous direction of the robot main body 100.

For example, assume that the sensor part 200 comprises two magnetic compasses and the data selecting part 300 makes an application of the rule that a disturbance can be ignored if sensing data output from the two magnetic compasses are the same. If sensing data containing a disturbance are output from the two magnetic compasses of the sensor part 200 and are the same by accident, the data selecting part 300 determines that the disturbance can be ignored (despite the fact that the disturbance should not be ignored), and then outputs the sensing data (containing the disturbance) to the filter part 400.

As a result, a direction of the robot main body 100 estimated by the filter part 400 may be greatly different from the desired direction of the robot main body 100 with respect to the earth's magnetic field. This may result in movement of the moving robot apparatus to an erroneous direction.

Accordingly, it is important to find an accurate rule for the data selecting part 300. However, it is difficult to find a rule to allow the data selecting part 300 to accurately determine whether or not a disturbance is contained in the sensing data.

To solve such a problem partially, there has been proposed a method of estimating sensing data indirectly using a necessary condition to be satisfied and when the sensing data are not distorted by a disturbance, as disclosed in an article authored by Woong Kwon, Kyung-Shik Roh and Hak-Kyung Sung, and titled "Particles Filter-based Heading Estimation using Magnetic Compasses for mobile Robot Navigation", Proceedings of 2006 IEEE International Conference on Robotics and Automation. The reason for using the necessary condition is that it is not difficult to find the necessary condition satisfied when the sensing data are valid.

This method may reduce the likelihood of misjudgment as to the validity of the sensing data, however, it can not completely eliminate the likelihood of misjudgment because it uses only the necessary condition and, not a sufficient condition for the determination of validity of the sensing data.

SUMMARY OF THE INVENTION

The present general inventive concept provides a control system, which is capable of accurately estimating a direction of a robot main body using probabilistic methods when it can not be determined whether or not an external disturbance is reflected in data output from a sensor part. A moving robot apparatus having the control system is also provided along with a control method thereof.

The present general inventive concept also provides a control system, which is capable of accurately estimating a direction of a robot main body even when sensing data do not have a Gaussian probability distribution. A moving robot apparatus having the control system, and a control method thereof is also provided.

The present general inventive concept also provides a control system, which is capable of obtaining an optimal estimation value of a robot's direction by fusing various sensors having problems related to sensor validity.

The present general inventive concept also provides a control system, which is capable of accurately estimating a state variable by robustly fusing various sensors in a general sensor system including some sensors that output invalid data distorted by an excessive disturbance, a moving robot apparatus having the control system, and a control method thereof.

The foregoing and/or other aspects and utilities of the present general inventive concept can be achieved by providing a control method of a control system to estimate a current state variable using current data output from a sensor part in a control system. The method comprises determining whether the current data output from the sensor part satisfy a necessary condition; extracting a current sample value from a previous sample value from which a previous state variable is obtained; calculating a weight of the current data based on the current sample value, wherein a value of the weight depends on whether the necessary condition is satisfied by the current data; and estimating the current state variable based on the extracted current sample value and the calculated weight.

The foregoing and/or other aspects and utilities of the present general inventive concept can be also achieved by providing a method of controlling a moving robot apparatus having a robot main body and a sensor part that outputs current data related to a current direction of the robot main body with respect to the earth's magnetic field. The method comprising: determining whether the current data output from the sensor part satisfy a necessary condition, wherein the necessary condition is considered to be satisfied when the current data output from the sensor part are unaffected by the earth's magnetic field; extracting a current sample value from a previous sample value obtained from the sensor part, wherein the previous sample value relates to a previous direction of the robot main body; calculating a weight of the current data based on the current sample value, wherein a value of the weight depends on whether the necessary condition is satisfied by the current data; and estimating the current direction of the robot main body based on the extracted current sample value and the calculated weight.

The estimating the current direction of the robot main body may comprise calculating a probability distribution using the extracted current sample value and the calculated weight and by repeating the extracting the current sample value and calculating the weight by a predetermined number of times. A mean value of the probability distribution may be calculated to estimate the current direction of the robot main body.

The estimating the direction of the robot main body may comprise estimating the direction of the robot main body based on a mean value of the calculated probability distribution. The calculating the weight of the current data based on the current sample value may comprise calculating the weight of the current data according to the following equation 1 when the current data satisfy the necessary condition, and according to the following equation 2 when the current data do not satisfy the necessary condition:

$$p(Z_t|X_t,C,V)p(C|V)+p(Z_t|X_t,C_c,V)p(C_c|V); \text{ and} \qquad \text{<Equation 1>}$$

$$p(Z_t|X_t,C,V^c)p(C|V^c)+p(Z_t|X_t,C^c,V^c)p(C^c|V^c), \qquad \text{<Equation 2>}$$

where, $Z_t$ is current data at a present time "t", $X_t$ is an estimated value of a robot direction at the present time "t", C is an event where the current data do not have a data distortion due to the earth's magnetic field interference, $C^c$ is an event where the current data are affected by the earth's magnetic field interference, V is an event that satisfies the necessary condition when the sensor part does not have a data distortion due to a disturbance from the earth's magnetic field, and $V^c$ is an event that does not satisfy the necessary condition when the sensor part does not have a data distortion due to a disturbance from the earth's magnetic field.

The sensor part may comprise a magnetic compass. Furthermore, the direction of the robot main body may be estimated using a particle filter.

Thus, positional or directional control for the robot main body may be provided based on the estimated current direction.

The foregoing and/or other aspects and utilities of the present general inventive concept can also be achieved by providing a control system that comprises a sensor part, a necessary condition determining part, and a data estimator to perform various method operations recited above so as to estimate the current state variable (e.g., direction of a robot main body).

The foregoing and/or other aspects and utilities of the present general inventive concept can also be achieved by providing a moving robot apparatus comprising: a robot main body; a sensor part that outputs data related to a direction of the robot main body for an earth's magnetic field; a necessary condition determining part that sets a necessary condition satisfied when the output data are not affected by an external magnetic field, and determines whether current data output from the sensor part satisfy the necessary condition; and a data estimator that extracts a current sample value from a previous sample value from which the direction of the robot main body is obtained from the sensor part, calculates a weight of the current data based on the current sample value, depending on whether the necessary condition is satisfied, and estimates the direction of the robot main body based on the extracted current sample value and the calculated weight.

The data estimator can calculate the extracted current sample value and the calculated weight as a probability distribution by repeating operations of extracting the current sample value and calculating the weight by predetermined number of times.

The data estimator can estimate the direction of the robot main body based on a mean value of the calculated probability distribution.

The data estimator can comprise a weight calculator that calculates the weight of the current data based on the current sample value, and wherein the weight calculator calculates the weight of the current data according to the following equation 1 when the necessary condition determining part determines that the current data satisfy the necessary condition, and according to the following equation 2 when the necessary condition determining part determines that the current data do not satisfy the necessary condition;

$$p(Z_t|X_t,C,V)p(C|V)+p(Z_t|X_t,C^c,V)p(C^c|V) \qquad \text{<Equation 1>}$$

$$p(Z_t|X_t,C,V^c)p(C|V^c)+p(Z_t|X_t,C^c,V^c)p(C^c|V^c), \qquad \text{<Equation 2>}$$

where, Zt is current data at a present time t, Xt is an estimated value of a robot direction at the present time t, C is an event where the current data do not have a data distortion due to an external magnetic field interference, Cc is an event where the current data are affected by the external magnetic field interference, V is an event that satisfies a necessary condition to be satisfied when the sensor part does not have a data distortion due to a disturbance, Vc is an event that does not satisfy a necessary condition to be satisfied when the sensor part does not have a data distortion due to a disturbance.

The foregoing and/or other aspects and utilities of the present invention general inventive concept can also be achieved by providing a processor containing therein a method of controlling directional movement of a robotic apparatus, the method comprising: receiving current data output by a sensor part of the robotic apparatus and related to a current direction of a main body of the robotic apparatus with respect to an external interference; determining whether the current data output from the sensor part satisfy a necessary condition, wherein the necessary condition is considered to be satisfied when the current data output from the sensor part are unaffected by the external interference; extracting a current sample value from a previous sample value obtained from the sensor part, wherein the previous sample value relates to a previous direction of the main body; calculating a weight of the current data based on the current sample value, wherein a value of the weight depends on whether the necessary condition is satisfied by the current data; and estimating the current direction of the main body of the robotic apparatus based on the extracted current sample value and the calculated weight.

The estimating the current direction of the main body can be performed by calculating a mean value of a probability distribution using the extracted current sample value and the calculated weight.

The method may further comprise providing signals to the main body of the robotic apparatus based on the estimated current direction so as to control directional movement of the main body.

The foregoing and/or other aspects and utilities of the present invention general inventive concept can also be achieved by providing a data storage medium containing program instructions, which, when executed by a processor in a robotic device, cause the processor to perform the following operations: receive current data output by a sensor part of the robotic apparatus and related to a current direction of a main body of the robotic apparatus with respect to an external interference; determine whether the current data output from the sensor part satisfy a necessary condition, wherein the necessary condition is considered to be satisfied when the current data output from the sensor part are unaffected by the external interference; extract a current sample value from a previous sample value obtained from the sensor part, wherein the previous sample value relates to a previous direction of the main body; calculate a weight of the current data based on the current sample value, wherein a value of the weight depends on whether the necessary condition is satisfied by the current data; and estimate the current direction of the main body of the robotic apparatus based on the extracted current sample value and the calculated weight.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
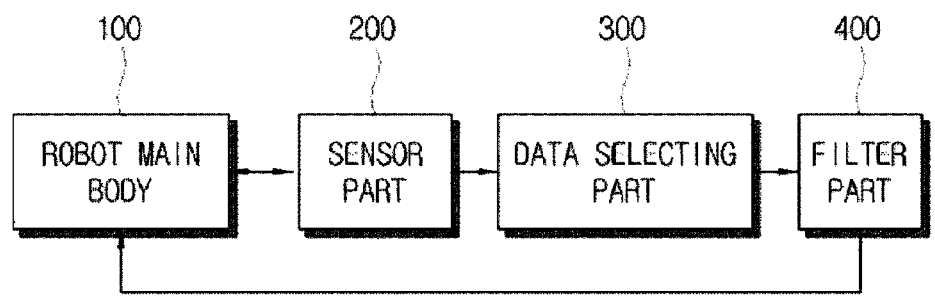
FIG. 1 is a control block diagram of a conventional moving robot apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
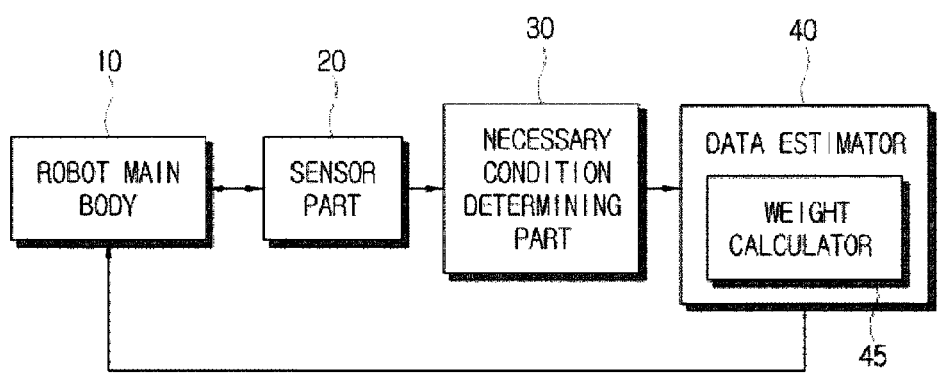
FIG. 2 is a control block diagram of a moving robot apparatus having a control system according to an embodiment of the present general inventive concept.
Figure 3:
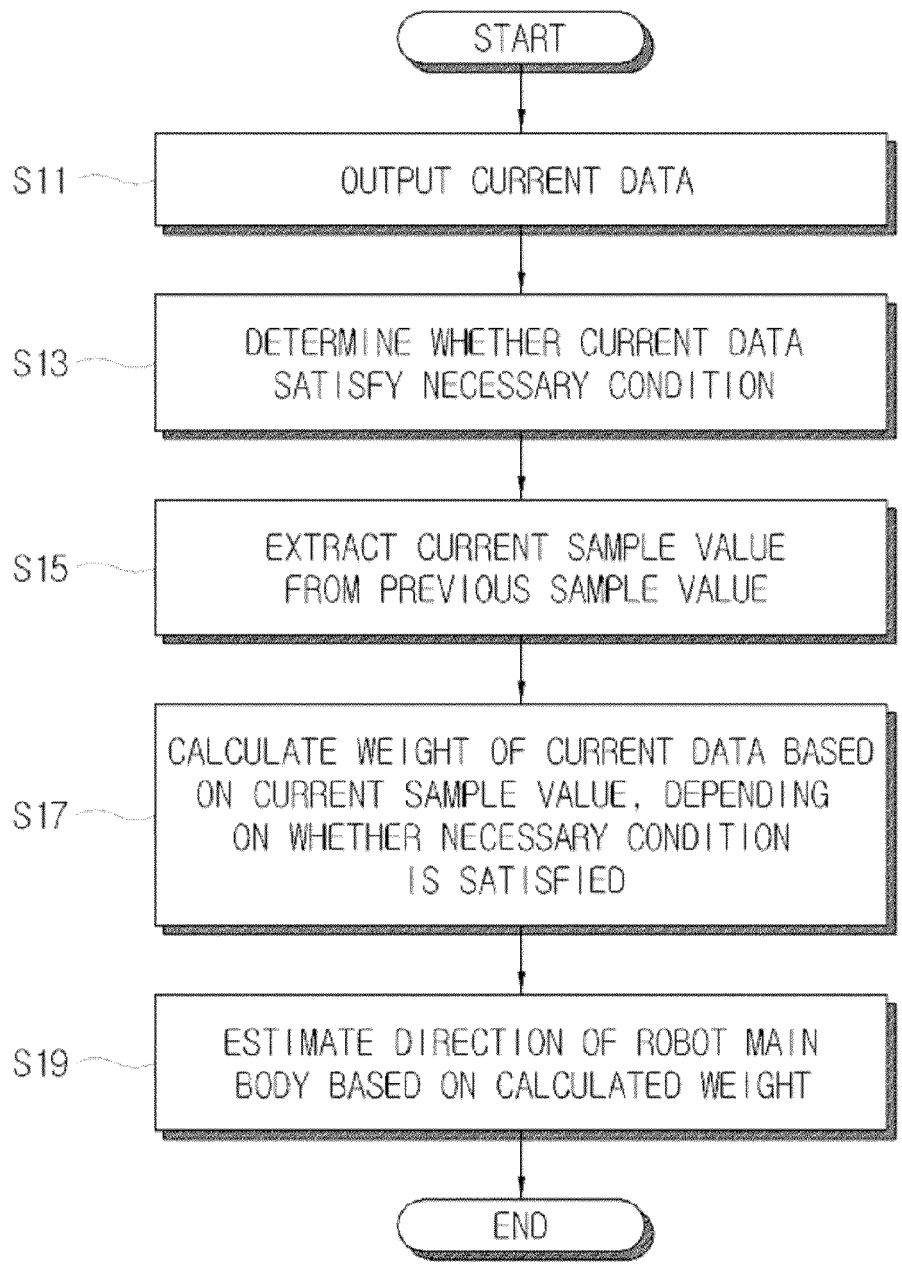
FIG. 3 is a flow chart illustrating an exemplary control process of estimating a state variable according to an embodiment of the present general inventive concept.

FIG. 2 is a control block diagram of a moving robot apparatus having a control system according to an embodiment of the present general inventive concept, and FIG. 3 is a flow chart illustrating an exemplary control process to estimate a state variable according to an embodiment of the present general inventive concept. As discussed below, the state variable may include, for example, a value to be determined for the direction or orientation of a robot main body in the moving robot apparatus. Although the term "value" may not be used hereinbelow in conjunction with the terms "direction", "orientation", etc., it is evident to one skilled in the art that the determination or estimation of "direction" or "orientation" discussed herein implicitly includes determination of a "value" (e.g., 30° from a reference orientation, etc.) for that "direction" so as to accomplish proper positional placement of the robot main body in an automatic manner.

As illustrated in FIG. 2, the moving robot apparatus, such as, for example, a cleaning robot, a service robot and the like, may comprise a robot main body 10, a sensor part 20, a necessary condition determining part 30, and a data estimator 40.

The robot main body 10 may have moving wheels (not illustrated). The robot main body 10 moves according to direction-related data provided from the data estimator 40, which will be described later, and may comprise a CPU or a microcomputer (not illustrated) to detect and control the robot main body's current movement position, current movement direction, and the like.

In an embodiment, the sensor part 20 may be attached to one side of the robot main body 10 and may output the direction-related data (with respect to the earth's magnetic field) of the robot main body 10. The sensor part 20 may include one or more sensors. The direction-related data output from the sensor part 20 may include a distortion, for example, by an external magnetic field interference (e.g., an interference by an electronic device such as a speaker), or by a steel frame, or a wall.

The necessary condition determining part 30 sets a necessary condition, which is considered to be satisfied when the robot main body 10 is not affected by an external magnetic field interference, and also determines whether current data satisfy the set necessary condition.

If the current data do not satisfy the necessary condition, the necessary condition determining part 30 determines that the current data are affected by the external magnetic field interference. Even when the current data satisfy the necessary condition, the current data may still be affected by the external magnetic field interference.

Hereinafter, a process of finding a necessary condition satisfied when the data are not affected by the external magnetic field interference will be described. For detailed equations for this process, see the above-mentioned article authored by Woong Kwon, Kyung-Shik Roh and Hak-Kyung Sung, and titled "Particles Filter-based Heading Estimation using Magnetic Compasses for mobile Robot Navigation", Proceedings of 2006 IEEE International Conference on Robotics and Automation.

In general, components $H_x$ and $H_y$ of the earth's magnetic field (EMF) sensed in x and y directions, respectively, are calculated from raw information $r_x$ and $r_y$ sensed by the sensor part 20 according to the following Equation 1.

$$H_x = |H_E|(r_x - o_x)/(r_{xmax} - r_{xmin})$$

$$H_y = |H_E|(r_y - o_y)/(r_{ymax} - r_{ymin}) \quad \text{<Equation 1>}$$

Where, $|H_E|$ represents a magnitude of the earth's magnetic field, $r_{xmax}$ and $r_{ymax}$ represent maximum values of $r_x$ and $r_y$, respectively, $r_{xmin}$ represents a minimum value of $r_x$, $r_{ymin}$ represents a minimum value of $r_y$, and $o_x$ and $o_y$ represent offset values of $0.5(r_x, r_{ymax} + r_x, r_{ymin})$ and $0.5(r_{xmax}, r_y + r_{xmin}, r_y)$, respectively.

The sensor part 20 performs an arctangent calculation for the calculated $H_x$ and $H_y$, and outputs arctangent values of $H_x$ and $H_y$ as current data. A process of outputting raw information from the sensor part 20 as the current data having a scale factor and an offset is referred to as 'calibration.'

Although this calibration process can compensate for an internal magnetic field interference generated in the interior of the moving robot apparatus, it can not compensate for an external magnetic field interference introduced from the outside (for example, electronic devices, walls, pillars, metal, etc.). Accordingly, the necessary condition is obtained by using upper and lower limits of an amplitude of the scale factor and upper and lower limits of the offset, which are calculated through the calibration process in a place where there is no or little external magnetic field interference, for example, a place remote from walls, pillars, metal, etc.

Using the current data output from the sensor part 20, the magnitude of the earth's magnetic field can be obtained according to the following Equation 2:

$$|H|^2 = \left(\frac{r_x - O_x}{\hat{A}_x} \times |H_E|\right)^2 + \left(\frac{r_y - O_y}{\hat{A}_y} \times |H_E|\right)^2, \quad <\text{Equation 2}>$$

where $O_x$ and $O_y$ represent offsets showing substantially constant values, and accordingly, may be assumed to be constant, and $A_x$ and $A_y$ represent amplitudes calculated through the calibration process.

Using the upper and lower limits of amplitudes $A_x$ and $A_y$, the following Equation 3 may be established with a reliability of 95%:

$$A_{yl} \leq A_y^{true} \leq A_{yu}$$

$$A_{xl} \leq A_x^{true} \leq A_{xu} \quad <\text{Equation 3}>$$

where $A_{yl}$ is a lower limit of $A_y$, $A_{yu}$ is an upper limit of $A_y$, $A_{xl}$ is a lower limit of $A_x$, and $A_{xu}$ is an upper limit of $A_x$.

In the Equation 3, $A_y^{true}$ and $A_x^{true}$ represent amplitudes in the earth's magnetic field region and have unknown values. The reason why $A_y^{true}$ and $A_x^{true}$ have the unknown values is that these amplitudes have an uncertainty due to a weak external magnetic field interference, measurement errors, unevenness of a floor (e.g., where the moving robot apparatus is placed), etc. However, since the uncertainty may equally be applied to x and y axes, it can be assumed that the following Equation 4 is established:

$$\frac{A_x^i - A_{xl}}{A_{xu} - A_{xl}} = \frac{A_y^l - A_{yl}}{A_{yu} - A_{yl}}. \quad <\text{Equation 4}>$$

Since amplitude obtained in the above Equation 4 is expected to conform to properties of a statistical distribution, the following Equation 5 may be also established:

$$A_y^{true} \cong aA_x^{true} + b \quad <\text{Equation 5}>$$

where $$a = (A_{yu} - A_{yl})/(A_{xu} - A_{xl})$$

$$b = (A_{yl}A_{xu} - A_{xl}A_{yu})/(A_{xu} - A_{xl})$$

At this time, when new unknown variables are defined as follows, $$\psi_y \equiv A_y^{true}/\hat{A}_y,$$

$\psi_x \equiv A_x^{true}/\hat{A}_x$, and safety margins, $\gamma_y$ and $\gamma_x$ are introduced, the following Equation 6 may be derived from the above Equation 3:

$$\frac{A_{xl}}{\hat{A}_x} - \gamma_x \leq \psi_x \leq \frac{A_{xu}}{\hat{A}_x} + \gamma_x \quad <\text{Equation 6}>$$

or $$\psi_{xl} \leq \psi_x \leq \psi_{xu}$$

$$\frac{A_{yl}}{\hat{A}_y} - \gamma_y \leq \psi_y \leq \frac{A_{yu}}{\hat{A}_y} + \gamma_y$$

or $$\psi_{yl} \leq \psi_y \leq \psi_{yu}$$

If the robot main body 10 is not affected by the external magnetic field interference, the following Equation 7 may be derived from the above Equation 1:

$$\left(\frac{r_x - O_x}{A_x^{true}}\right)^2 + \left(\frac{r_y - O_y}{A_y^{true}}\right)^2 = 1. \quad <\text{Equation 7}>$$

Using the above Equations 2 and 6, the following Equation 8 related to the current data output from the sensor part 20 may be obtained, and the following Equation 9 may be also obtained under an assumption that the current data are not affected by the external magnetic field interference:

$$|H|^2/|H_E|^2 = (\psi_x \sin^2 \theta + \psi_y \cos^2 \theta), \quad <\text{Equation 8}>$$

where $\theta$ is the current data.

$$\theta^{true}\left(= \arctan \frac{A_y^{true}(r_x - O_x)}{A_x^{true}(r_y - O_y)}\right) \quad <\text{Equation 9}>$$

Arranging the above Equation 8, the following Equation 10 is obtained:

$$|H|^2/|H_E|^2 = 0.5(\psi 2x + \psi 2y + (\psi 2y - \psi 2x)\cos 2\theta) \quad <\text{Equation 10}>$$

Inserting the above Equations 5 and 6 in the obtained Equation 10, the following Equation 11 is obtained:

$$(\psi_l^+ + \phi_l) \leq 2|H|^2/|H_E|^2 \leq (\psi_u^+ + \phi_u) \quad <\text{Equation 11}>$$

Where, $\psi_l^+ = \psi_{xl}^2 + \psi_{yl}^2$, $\phi_l = \min(\psi_l^- \cos 2\theta, \psi_u^- \cos 2\theta)$, $\psi_u^+ = \psi_{xu}^2 + \psi_{yu}^2$, $\phi_u = \max(\psi_l^- \cos 2\theta, \psi_u^- \cos 2\theta)$, $\psi_l^- = \min_{\psi_y = a'\psi_x + b}(\psi_y^2 - \psi_x^2)$ and $\psi_u^- = \min_{\psi_y = a'\psi_x + b}(\psi_y^2 - \psi_x^2)$, and $\theta$ is the current data.

If the sensor part 20 comprises two sensors, there may occur a difference between the values of the magnitude of the earth's magnetic field detected by each of the two sensors. In that case, the following Equation 12 may be obtained:

$$f_{xl} + f_{yl} + f_y^- \leq 2(|^1H|^2 \cdot |^2H|^2)/|H_E|^2 \leq f_{xu} + f_{yu} + f_u^- \quad <\text{Equation 12}>$$

where $f_{xl} = \min f_x({}^1\psi_x)$, $f_{yl} = \min f_y({}^1\psi_y)$, $f_{xu} = \max f_x({}^1\psi_x)$, $f_{yu} = \max f_y({}^1\psi_y)$, with ${}^1\psi_{xl} \leq {}^1\psi_x \leq {}^1\psi_{xu}$ and ${}^1\psi_{yl} \leq {}^1\psi_y \leq {}^1\psi_{yu}$, $f_x({}^1\psi_x) = {}^1\psi_x^2(\alpha'_x {}^1\psi_x + \beta'_x)^2$, $f_x({}^1\psi_y) = {}^1\psi_y^2(\alpha'_y {}^1\psi_y + \beta'_y)^2$, $f_l^- = \min(g_l \cos 2\theta, g_u \cos 2\theta)$, $f_u^- = \max(g_l \cos 2\theta, g_u \cos 2\theta)$, $g_l = \min_{{}^1\psi_y = a'{}^1\psi_x + b}(f_y({}^1\psi_y) \cdot f_x({}^1\psi_x))$, $g_u = \max_{{}^1\psi_y = a'{}^1\psi_x + b}(f_y({}^1\psi_y) \cdot f_x({}^1\psi_x))$.

The above Equations 11 and 12 indicate necessary conditions to be satisfied when the robot main body 10 is not affected by the external magnetic field interference. Accordingly, the necessary condition determining part 30 determines whether the current data satisfy the Equation 11, and then, if the Equation 11 is satisfied, determines whether the current data satisfy the Equation 12.

If the current data do not satisfy the Equation 11, or if the current data do not satisfy the Equation 12 although the current data satisfy the Equation 11, the necessary condition determining part 30 determines that the current data are affected by the external magnetic field interference.

Although the number of necessary conditions is two in the embodiment discussed above, it should be understood that the number of necessary conditions may alternatively be one or three or more.

The data estimator 40 compares the current data output from the sensor part 20 with a sample value to be output from the sensor part 20 and estimates a current state variable (e.g., a value for the direction of the robot main body 10 as noted above) based on a result of the comparison. In this embodiment, the data estimator 40 may be implemented by a particle filter which can calculate an accurate value even when input data have a non-Gaussian probability distribution.

In this embodiment, the data estimator 40 may further comprise a weight calculator 45 that calculates weights for the current data (output from the sensor 20) based on the sample value (also output from the sensor 20), which will be described in more detail later.

Hereinafter, a process of correcting the current data output from the sensor part 20 will be described in detail with reference to FIG. 3, which is a flow chart illustrating an exemplary control process of estimating a state variable (e.g., a value for the direction or orientation of the robot main body 10) according to an embodiment of the present general inventive concept.

Referring to FIG. 3, when current data $Z_t$ are output from the sensor part 20 at a present time "t" at operation S11, the necessary condition determining part 30 determines (at operation S13) whether the current data $Z_t$ satisfy a necessary condition.

The data estimator 40 extracts, at operation S15, a plurality (N) of sample values $X_{t-1}$, from a probability distribution $p(x_{t-1}) = \{x_{t-1}^j, w_{t-1}^j\}_{j=1,\ldots,N}$, where the plurality (N) of sample values $X_{t-1}$ were extracted at a previous time "t−1" and have corresponding weights $W_{t-1}$, assigned thereto at the previous time "t−1". In this case, a sample value having a higher weight is more likely to be extracted. Details of the probability distribution will be described later.

In addition, the data estimator 40 extracts an $i^{th}$ sample value $Xi_{t-1}$ to be output at the present time "t" in consideration of a control input for the previously extracted $i^{th}$ sample value $Xi_{t-1}$ at the previous time "t−1". In this case, a sample value $Xi_t$ at the present time "t" is extracted using a measurement error probability distribution, $P(X_t|X_{t-1}, V_{t-1})$, (where $V_{t-1}$ is a control input at the previous time "t−1").

For example, it is assumed that the sample value $X_{t-1}$ at the previous time "t−1" is 30° and a control instruction to move by 2° is input from the robot main body 10. Then, the data estimator 40 calculates a Gaussian probability distribution having a mean value of 32° (which is an addition of the sample value $X_{t-1}$ of 30° at the previous time t−1 and the control input of 2°), and extracts the sample value $Xi_t$ at the present time "t" from the calculated Gaussian probability distribution.

At operation S17, the weight calculator 45 of the data estimator 40 calculates weights $Wi_t$ from a probability that the current data $Z_t$ fall within a predetermined range of the extracted sample value $Xi_t$. Here, a weight Wt means a likelihood $p(z|x)$, that is, a probability of obtaining the current data $Z_t$ from the sample value $Xi_t$ at the present time "t".

Hereinafter, how the weight calculator 45 calculates the weights $Wi_t$ will be described.

To begin with, an event C where the current data $Z_t$ are not affected by the external magnetic field interference and an event V where the current data $Z_t$ satisfy the necessary condition are defined to calculate the weights $Wi_t$. Specifically, the event C has to be generated in order to prevent the current data $Z_t$ from not being affected by the external magnetic field interference. However, it is typically impossible to confirm whether the event C is generated by only the current data $Z_t$ output from the sensor part 20. However, whether the event V is generated may be confirmed from a result of determination of the necessary condition determining part 30. Accordingly, when the event V is generated, the following Equation 13 may be obtained according to Bayes' theorem and the Total theorem.

$$^k w_t^i = p(^k z_t | x_t^i, C, V) p(C|V) + p(^k z_t | x_t^i, C^c, V) p(C^c|V).$$ <Equation 13>

Where, $Z_t$ is current data at the present time "t", $X_t$ is an estimated value of a robot direction at the present time "t", C is an event where the current data do not have a data distortion due to the external magnetic field interference, $C^c$ is an event where the current data are affected by the external magnetic field interference, V is an event that satisfies a necessary condition when the sensor part does not have a data distortion due to a disturbance, $V^c$ is an event that does not satisfy the necessary condition when the sensor part does not have a data distortion due to a disturbance, and the superscript "k" denotes a $k_{th}$ sensor.

Similarly, when the event V is not generated, the following Equation 14 may be obtained.

$$^k w_t^i = p(^k z_t | x_t^i, C, V^c) p(C|V^c) + p(^k z_t | x_t^i, C^c, V^c) p(C^c|V^c).$$ <Equation 14>

Where, $Z_t$ is current data at the present time "t", $X_t$ is an estimated value of a robot direction at the present time "t", C is an event where the current data do not have a data distortion due to the external magnetic field interference, $C^c$ is an event where the current data are affected by the external magnetic field interference, V is an event that satisfies a necessary condition when the sensor part does not have a data distortion due to a disturbance, $V^c$ is an event that does not satisfy the necessary condition when the sensor part does not have a data distortion due to a disturbance, and the superscript "k" denotes a $k_{th}$ sensor.

It may be assumed that a distribution of the current data $Z_t$ output from the sensor 20 is generally independent of the event V. Therefore, the following Equations 15 and 16 may be established.

$$p(^k z_t | x_t^i, C) = p(^k z_t | x_t^i, C, V) = p(^k z_t | x_t^i, C, V^c)$$ <Equation 15>

$$p(^k z_t | x_t^i, C^c) = p(^k z_t | x_t^i, C^c, V) = p(^k z_t | x_t^i, C^c, V^c)$$ <Equation 16>

The probability distribution of the above Equation 15 represents that the event C is generated, that is, the current data $Z_t$ are not affected by the external magnetic field interference. Accordingly, this probability distribution may be expressed as a Gaussian probability distribution of the following Equation 17.

$$p(^k z_t | x_t^i, C) \sim N(h(x_t^i), {}^k \sigma_z)$$ <Equation 17>

Where, $\sigma_z$ is a standard deviation of measurement errors of the sensor part 20, including genuine measurement errors, errors due to uncertainty of calibration, errors in manufacture of sensors, etc., which may be experimentally determined.

The probability distribution of the above Equation 16 represents that the current data $Z_t$ are affected by the external magnetic field interference. This probability distribution may be any probability distribution to be used to extract the sample value $X_t$ instead of the current data $Z_t$, and accordingly, may be expressed as a Gaussian probability distribution of the following Equation 18.

$$p(^k z_t | x_t^i, C^c) \sim N(h(x_t^i), {}^k \sigma_{h(x)}) \qquad \text{<Equation 18>}$$

Where, $\sigma_{h(x)}$, as a standard deviation of the current data $Z_t$, is a system error independent of the measurement errors.

When the current data $Z_t$ output from the sensor part 20 satisfy the necessary condition, P(C|V) in the above Equation 13 represents a probability that the current data $Z_t$ are not affected by the external magnetic field interference, and may be experimentally obtained.

$P(C^c|V)$ in the above Equation 13 may be calculated from 1−P(C|V), and $P(C^c|V^c)$ in the above Equation 14 may be obtained according to the following Equation 19.

$$p(C^c|V^c) = \frac{(1 - p(C) + p(C)p(V|C))p(C|V) - p(C)p(V|C)}{p(C|V) - p(C)p(V|C)} \qquad \text{< Equation 19 >}$$

Where, P(C) is a probability that the current data $Z_t$ are not affected by the external magnetic field interference, and P(V|C) is a probability that the current data $Z_t$ satisfy the necessary condition when the current data $Z_t$ are not affected by the external magnetic field interference. These probabilities may be experimentally obtained under circumstances having no external magnetic field interference.

Accordingly, the weight calculator 45 can calculate the weights $Wi_t$ using the above Equation 13 when the current data $Z_t$ satisfy the necessary condition, and using the above Equation 14 when the current data $Zt$ does not satisfy the necessary condition. Here, since the above Equations 13 and 14 do not have the Gaussian probability distribution, the weights $Wi_t$ can be obtained using a particle filter (not shown).

The data estimator 40 estimates the direction of the robot main body 10 according to the calculated weights $Wi_t$. In this embodiment, the weight calculator 45 may repeat the processes (the operations S13 and S15) of calculating the weights $Wi_t$ by N times. The more the number of repetitions, the higher the reliability of a corrected current estimated value $Xt[Z_t]$.

For example, if the number of repetition times is 100 (i.e., N=100), a probability distribution $(P = \{X_t^i, W_t^i\}_{i=1 \ldots 100})$ having the current sample values $Xi_t$ and the calculated weights $Wi_t$ may be obtained, with a mean value $(\Sigma X_t * W)$ as the direction of the robot main body 10 at the present time t.

Then, the data estimator 40 provides the robot main body 10 with the probability distribution $(P = \{X_t^i, W_t^i\}_{i=1 \ldots 100})$ for the sample values $Xt$ at the present time "t" and the weights $Wt$, which will be used to move the robot main body 10 at a next time "t+1".

Thereafter, the operations S11 to S17 are repeated at the next time "t+1", and the probability distribution $(P = \{X_t^i, W_t^i\}_{i=1 \ldots 100})$ provided from the robot main body 10 at the present time "t" is used in the operation S11 at the next time "t+1".

Through the above-described processes, at operation S19, an actual direction (i.e., the current state variable) of the robot main body 10 can be accurately calculated depending on whether or not the necessary condition is satisfied under circumstances where the current data output from the sensor part 20 may be affected by the external magnetic field interference.

In addition, since the data estimator 40 may be implemented by the particle filter (not shown), an actual direction of the robot main body 10 can be accurately calculated at operation S19 even when the current data output from the sensor part 20 have a non-Gaussian distribution.

Figure 4:
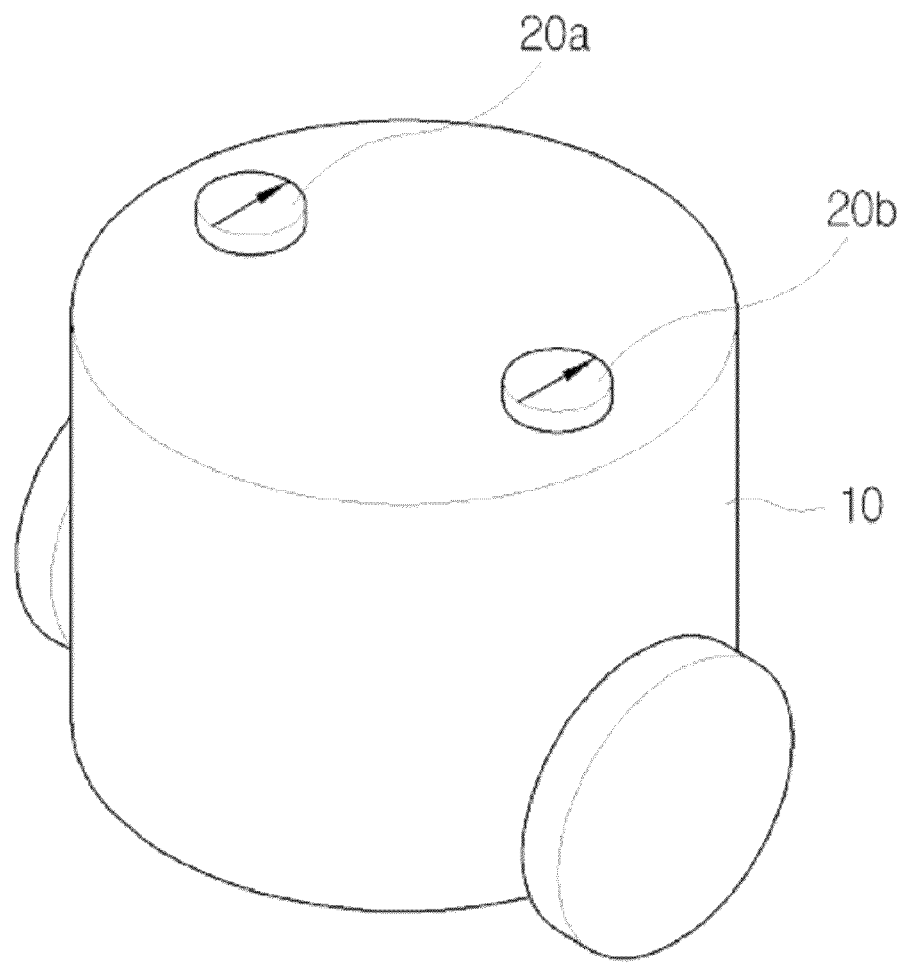
FIG. 4 is a perspective view of a moving robot apparatus having a control system according to an embodiment of the present general inventive concept.

FIG. 4 is a perspective view of a moving robot apparatus having a control system according to an embodiment of the present general inventive concept. With reference to FIG. 4, a moving robot apparatus having the sensor part 20 (e.g., sensors 20a and 20b) embodied as a magnetic compass and the data estimator 40 embodied as the particle filter (not illustrated) will be described in more detail. It is noted here that the necessary condition determining part 30 may also be included as part of the robot apparatus (e.g., inside the robot main body 10) even though such inclusion is not visible in FIG. 4.

As illustrated in FIG. 4, the sensor part 20 comprises a plurality of magnetic compasses including, for example, a first magnetic compass (hereinafter referred to as a 'first sensor') 20a and a second magnetic compass (hereinafter referred to as a 'second sensor') 20b.

The first sensor 20a and the second sensor 20b are attached to the robot main body 10 and output data related to the direction of the robot main body 10 with respect to the earth's magnetic field, that is, an angle by which the robot main body 10 is deviated from the earth's magnetic north. At this time, the first sensor 20a and the second sensor 20b may sense the direction of the robot main body 10 simultaneously and output a first current data and a second current data, respectively.

The necessary condition determining part 30 determines whether or not the first current data output from the first sensor 20a and the second current data output from the second sensor 20b satisfy the necessary condition.

When the particle filter (e.g., the particle filter that is used to implement the data estimator 40) extracts the sample values $X_t$ at the present time from the sample values $X_{t-1}$ at the previous time, the weight calculator 45 calculates a first weight to make the first current data output from the first sensor 20a fall within a predetermined range of the extracted sample values $X_t$ and a second weight to make the second current data output from the second sensor 20b fall within the predetermined range of the extracted sample values $X_t$.

Since the first sensor 20a and the second sensor 20b are independent of each other, the particle filter calculates a weight Wt by multiplying the first weight by the second weight and estimates the direction of the robot main body 10 at the present time "t" using the calculated weight Wt. This direction at the present time "t" is thus treated as a current state variable whose value is estimated from the extracted sample values and corresponding calculated weights.

Because a current estimated value (of the direction of the robot main body 10) can be calculated through the above described process using a probability when the sensor part 20 comprises the plurality of magnetic compasses, a movement direction of the robot main body 10 can be accurately calculated.

In addition, even when it can not be determined whether the current data output from the magnetic compasses 20a and 20b are affected by the external magnetic field interference, a movement direction of the robot main body 10 can be accurately calculated using the particle filter.

Hereinafter, a method of controlling the moving robot apparatus having the control system according to an embodiment of the present general inventive concept will be described with reference to a FIG. 5, which is a flow chart illustrating an operation of the moving robot apparatus in FIG. 4 having the control system according to an embodiment of the present general inventive concept.

Figure 5:
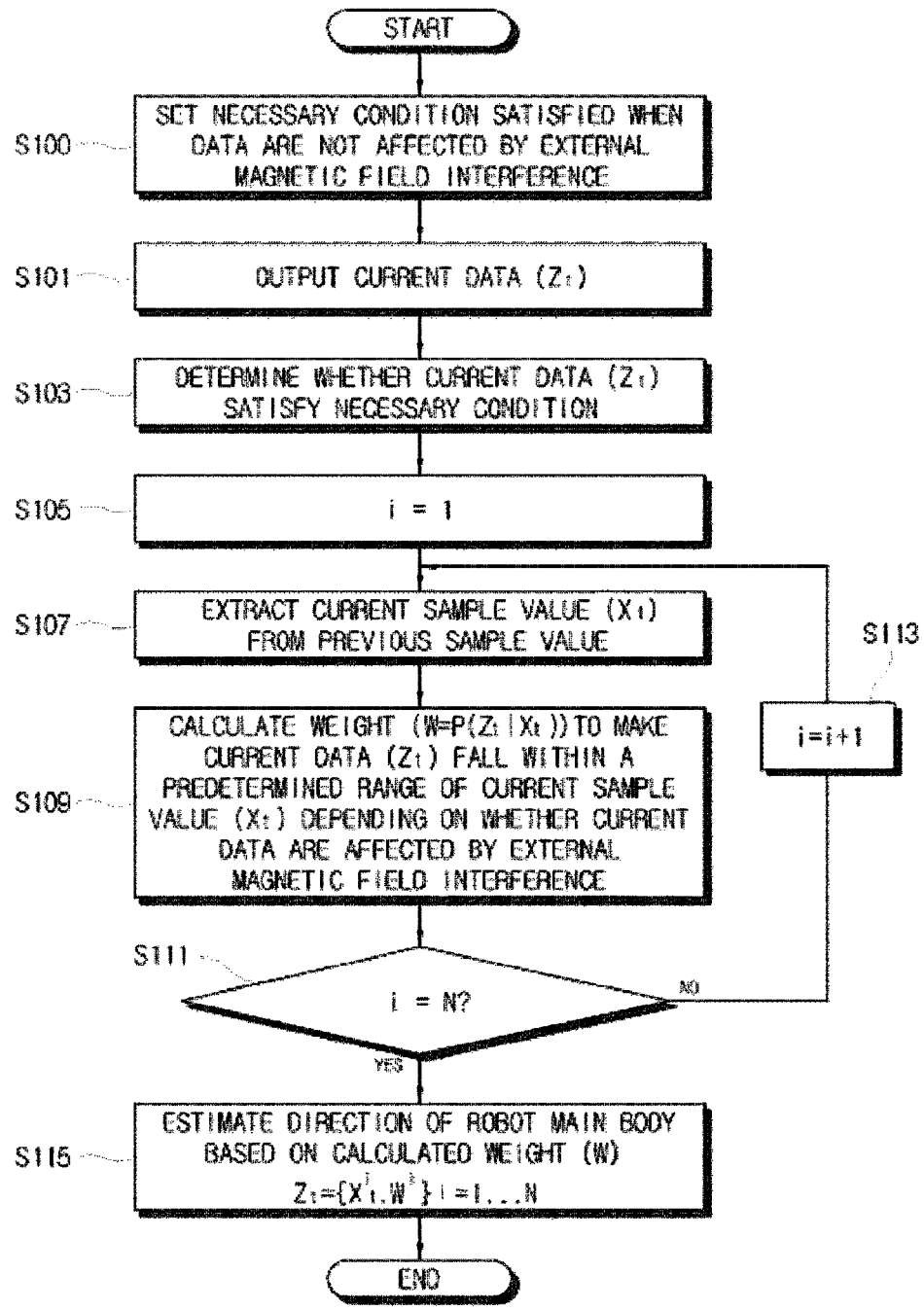
FIG. 5 is a flow chart illustrating an operation of the moving robot apparatus in FIG. 4 having the control system according to an embodiment of the present general inventive concept.

As illustrated in FIG. 5, at operation S100, the necessary condition determining part 30 sets a necessary condition as "satisfied" when data output from the sensor part 20 are not affected by an external magnetic field interference. Hence, when the data output from the sensor part 20 are found not to be affected by the external magnetic field interference, the necessary condition is considered "satisfied."

At operation S101, the sensor part 20 outputs current data $Z_t$ related to a direction of the robot main body 10 with respect to the earth's magnetic field.

At operation S103, the necessary condition determining part 30 determines whether the current data $Z_t$ output from the sensor part 20 has satisfy the necessary condition.

At operation S105, the count variable "i" is initialized to "1" to repeat subsequent operations by N times.

At operation S107, the data estimator 40 extracts a sample value $X_t$ at a present time from a sample value $X_{t-1}$ extracted at a previous time from the sensor part 20. At this time, the sample value $X_t$ may be extracted in consideration of a previous data $Z_{t-1}$ and a control input related to a movement of the robot main body 10 at the previous time t−1.

At operation S109, the weight calculator 45 calculates a weight $W_t$ of the current data $Z_t$ based on the extracted sample value $X_t$, depending on whether the necessary condition from the necessary condition determining part 30 is satisfied.

Specifically, the weight $W_t$ is calculated according to the above Equation 13 when the current data $Z_i$ satisfy the necessary condition, and the weight $W_t$ is calculated according to the above Equation 14 when the current data $Z_i$ do not satisfy the necessary condition. These two equations are reproduced below for ease of reference.

$$^{k}w_t^i = p(^{k}z_t|x_t^i, C, V)p(C|V) + p(^{k}z_t|x_t^i, C^c, V)p(C^c|V) \quad \text{<Equation 13>}$$

$$^{k}w_t^i = p(^{k}z_t|x_t^i, C, V^c)p(C|V^c) + p(^{k}z_t|x_t^i, C^c, V^c)p(C^c|V^c) \quad \text{<Equation 14>}$$

Where, $Z_t$ is current data, $X_t$ is a sample value, C is an event where the current data are not affected by the external magnetic field interference, $C^c$ is an event where the current data are affected by the external magnetic field interference, V is an event that satisfies the necessary condition, and $V^c$ is an event that does not satisfy the necessary condition.

At operation S111, the data estimator 40 compares "i" with N to determine whether the operation of calculating the weight $W_t$ of the current data $Z_t$ using the extracted sample value $X_t$ is repeated by N times.

If it is determined that "i" is not equal to N, "i" is incremented by "1" at operation S113, and then, the above operations S107 and S109 are repeated.

If it is determined that "i" is equal to N, the data estimator 40 calculates a probability distribution $(P=\{X_t^i, W_t^i\}_{i=1\ldots N})$ for the weight $W_t$ in which the current data $Z_t$ have no external magnetic field interference, and estimates the direction of the robot main body 10 based on the calculated probability distribution $(P=\{X_t^i, W_t^i\}_{i=1\ldots N})$ at operation S115. Here, the estimated direction of the robot main body 10 is a mean value $(\Sigma X_t^i * W)$ of the probability distribution $(P=\{X_t^i, W_t^i\}_{i=1\ldots N})$.

Through the above-described operations, data related to the direction of the robot main body 10 can be calculated even under circumstances where there exists an external magnetic field interference due to obstacles.

It is noted here that, in an embodiment of the present general inventive concept, various functionalities discussed herein with reference to the necessary condition determining part 30 and the data estimator 40 in FIG. 2 may be implemented using a suitably programmed processor, CPU, or controller unit (not illustrated), which may be a part of the moving robot apparatus. Additionally, in another embodiment of the present general inventive concept, a data storage medium (not illustrated) including, for example, a memory unit (not illustrated) in or associated with the robot main body 10, an optical data storage unit (not illustrated) such as a compact disc (CD) or an electromagnetic data storage unit (not illustrated) such as a data cassette, may be provided with suitable software or program instructions stored thereon. The program instructions, when executed by the processor or CPU (not illustrated), may configure the processor or CPU to perform the functionalities (discussed hereinabove) of the necessary condition determining part 30 and/or the data estimator 40.

In addition, because a magnetic compass sensing an absolute direction is applicable to a moving robot, for example, a cleaning robot, a service robot, etc., used indoors, a problem which may occur due to self-position recognition and auto-running of the moving robot may be addressed using the position determination methodology according to one embodiment of the present general inventive concept.

As described above, according to the present general inventive concept, the necessary condition determining part determines whether the current data satisfy the necessary condition. The necessary condition determining part does not use a rule to determine the validity of a sensor, thereby avoiding the likelihood of misjudgment of the rule. Then, the particle filter is applied to obtain an estimated value of data using a conditional probability for both of validity and invalidity of the sensor, which conditional probability is calculated based on a result of the determination of whether or not the current data satisfy the necessary condition.

The conditional probability may have a non-Gaussian probability distribution. Accordingly, the particle filter can obtain an optimal estimated value when data having a non-Gaussian probability distribution are input to the particle filter.

In addition, as described above, an accurate direction, e.g., a heading angle, of a moving robot can be found using a plurality of magnetic compasses.

Although it is discussed above that the particle filter estimates the direction of the robot main body using the weights (calculated as part of a weighted estimation approach), it should be understood that the particle filter may estimate the direction of the robot main body using factors other than the weights.

As apparent from the above description, the present general inventive concept provides a moving robot apparatus and a control method thereof, which are capable of very accurately estimating a movement direction of a robot main body even under circumstances where data output from a sensor part may be affected by an external magnetic field interference.

In addition, the present general inventive concept provides a moving robot apparatus and a control method thereof, which are capable of accurately estimating a movement direction of a robot main body using a particle filter and even though effects of an external magnetic field may not be known under circumstances where data output from a sensor part may be affected by an excessive external magnetic field interference.

Further, the present general inventive concept provides a moving robot apparatus and a control method thereof, which are capable of accurately estimating a direction of a robot main body by determining whether data output from a sensor part may be affected by an external magnetic field interference using a probability satisfying a necessary condition, and then, by using a conditional probability according to whether or not the necessary condition is satisfied.

Furthermore, the present general inventive concept provides a moving robot apparatus and a control method thereof, which are capable of overcoming a direction or positional orientation related problem associated with self-position recognition and auto-running of an indoor moving robot such as, for example, a cleaning robot, a service robot and so on, by allowing a magnetic compass measuring an absolute direction to be applied to the moving robot apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a moving robot apparatus having a robot main body and a sensor part that outputs current data related to a current direction of the robot main body with respect to the earth's magnetic field, the method comprising:
   determining via a necessary condition determining part whether the current data output from the sensor part satisfy a necessary condition, wherein the necessary condition is considered to be satisfied when the current data output from the sensor part are unaffected by an external magnetic field interference;
   extracting via a data estimator a current sample value from a previous sample value obtained from the sensor part, wherein the previous sample value relates to a previous direction of the robot main body;
   calculating via a weight calculator a weight of the current data based on the current sample value, wherein a value of the weight depends on whether the necessary condition is satisfied by the current data; and
   estimating via the data estimator the current direction of the robot main body based on the extracted current sample value and the calculated weight, wherein the weight is a probability of obtaining a current data from a sample value at a present time, wherein the current direction estimated via the data estimator is at least one of stored in memory and included within the direction-related data provided to the robot main body from the data estimator.

2. The control method according to claim 1, wherein the estimating the current direction of the robot main body comprises calculating a probability distribution using the extracted current sample value and the calculated weight and by repeating the extracting the current sample value and the calculating the weight by a predetermined number of times.

3. The control method according to claim 2, wherein the estimating the current direction of the robot main body further comprises:
   estimating the current direction of the robot main body based on a mean value of the calculated probability distribution.

4. The control method according to claim 3, wherein the calculating the weight of the current data based on the current sample value comprises calculating the weight of the current data according to the following equation 1 when the current data satisfy the necessary condition, and according to the following equation 2 when the current data do not satisfy the necessary condition:

$$Wt=p(Z_t|X_t,C,V)p(C|V)+p(Z_t|X_t,C^c,V)p(C^c|V) \quad \text{<Equation 1>}$$

$$Wt=p(Z_t|X_t,C,V^c)p(C|V^c)+p(Z_t|X_t,C^c,V^c)p(C^c|V^c) \quad \text{<Equation 2>}$$

where, $Z_t$ is current data at a present time t, $X_t$ is an estimated value of a robot direction at the present time t, C is an event where the current data do not have a data distortion due to the external magnetic field interference, $C^c$ is an event where the current data are affected by the external magnetic field interference, V is an event that satisfies the necessary condition when the sensor part does not have a data distortion due to the external magnetic field interference, and $V^c$ is an event that does not satisfy the necessary condition when the sensor part does not have a data distortion due to the external magnetic field interference.

5. The control method according to claim 4, wherein the sensor part comprises a magnetic compass.

6. The control method according to claim 4, wherein the estimating the current direction of the robot main body further comprises:
   estimating the current direction of the robot main body using a particle filter.

7. The control method according to claim 2, wherein the calculating the weight of the current data based on the current sample value comprises calculating the weight of the current data according to the following equation 1 when the current data satisfy the necessary condition, and according to the following equation 2 when the current data do not satisfy the necessary condition:

$$Wt=p(Z_t|X_t,C,V)p(C|V)+p(Z_t|X_t,C^c,V)p(C^c|V) \quad \text{<Equation 1>}$$

$$Wt=p(Z_t|X_t,C,V^c)p(C|V^c)+p(Z_t|X_t,C^c,V^c)p(C^c|V^c) \quad \text{<Equation 2>}$$

where, $Z_t$ is current data at a present time t, $X_t$ is an estimated value of a robot direction at the present time t, C is an event where the current data do not have a data distortion due to the external magnetic field interference, $C^c$ is an event where the current data are affected by the external magnetic field interference, V is an event that satisfies the necessary condition when the sensor part does not have a data distortion due to the external magnetic field interference, and $V^c$ is an event that does not satisfy the necessary condition when the sensor part does not have a data distortion due to the external magnetic field interference.

8. The control method according to claim 7, wherein the sensor part comprises a magnetic compass.

9. The control method according to claim 7, wherein the estimating the current direction of the robot main body comprises estimating the current direction of the robot main body using a particle filter.

10. The control method according to claim 1, wherein the calculating the weight of the current data based on the current sample value comprises calculating the weight of the current data according to the following equation 1 when the current data satisfy the necessary condition; and according to the following equation 2 when the current data do not satisfy the necessary condition:

$$Wt=p(Z_t|X_t,C,V)p(C|V)+p(Z_t|X_t,C^c,V^c)p(C^c|V) \quad \text{<Equation 1>}$$

$$Wt=p(Z_t|X_t,C,V^c)p(C|V^c(p(Z_t|X_t|X_t,C^c,V^c)p(C^c|V^c) \quad \text{<Equation 2>}$$

where, $Z_t$ is current data at a present time t, $X_t$ is an estimated value of a robot direction at the present time t, C is an event where the current data do not have a data distortion due to the external magnetic field interference, $C^c$ is an event where the current data are affected by the external magnetic field interference, V is an event that satisfies the necessary condition when the sensor part does not have a data distortion due to the external magnetic field interference, and $V^c$ is an event that does not satisfy the necessary condition when the sensor part does not have a data distortion due to the external magnetic field interference.

11. The control method according to claim 10, wherein the sensor part comprises a magnetic compass.

12. The control method according to claim 10, wherein the estimating the current direction of the robot main body further comprises:
estimating the current direction of the robot main body using a particle filter.

13. The control method according to claim 1, further comprising positioning the robot main body in a next direction based on the estimated current direction.

14. A moving robot apparatus comprising:
a robot main body;
a sensor part operatively coupled to the robot main body to output data related to a current direction of the robot main body with respect to the earth's magnetic field;
a necessary condition determining part operatively coupled to the sensor part and configured to set a necessary condition to be satisfied and to determine whether the current data output from the sensor part satisfy the necessary condition, wherein the necessary condition is considered to be satisfied when the current data output are unaffected by an external magnetic field interference; and
a data estimator operatively coupled to the necessary condition determining part and the robot main body and configured to extract a current sample value from a previous sample value obtained from the sensor part, wherein the previous sample value relates to a previous direction of the robot main body, to calculate a weight of the current data based on the current sample value, wherein a value of the weight depends on whether the necessary condition is satisfied by the current data, and to estimate the current direction of the robot main body based on the extracted current sample value and the calculated weight, wherein the estimated current direction is at least one of stored in memory and included within the direction-related data provided to the robot main body.

15. The moving robot apparatus according to claim 14, wherein the sensor part comprises a magnetic compass.

16. The moving robot apparatus according to claim 14, wherein the data estimator is configured to calculate a probability distribution using the extracted current sample value and the calculated weight and by repeating operations of extracting the current sample value and calculating the weight by a predetermined number of times.

17. The moving robot apparatus according to claim 16, wherein the data estimator is configured to estimate the current direction of the robot main body based on a mean value of the calculated probability distribution.

18. The moving robot apparatus according to claim 14, wherein the data estimator comprises a weight calculator that is configured to calculate the weight of the current data based on the current sample value according to the following equation 1 when the necessary condition determining part determines that the current data satisfy the necessary condition, and according to the following equation 2 when the necessary condition determining part determines that the current data do not satisfy the necessary condition:

$$p(Z_t|X_t,C,V)p(C|V)+p(Z_t|X_t,C^c,V)p(C^c|V) \quad \text{<Equation 1>}$$

$$p(Z_t|X_t,C,V^c)p(C|V^c)+p(Z_t|X_t,C^c,V^c)p(C^c|V^c) \quad \text{<Equation 2>}$$

where, $Z_t$ is current data at a present time t, $X_t$ is an estimated value of a robot direction at the present time t, C is an event where the current data do not have a data distortion due to the external magnetic field interference, $C^c$ is an event where the current data are affected by the external magnetic field interference, V is an event that satisfies the necessary condition when the sensor part does not have a data distortion due to the external magnetic field interference, and $V^c$ is an event that does not satisfy the necessary condition when the sensor part does not have a data distortion due to the external magnetic field interference.

19. The moving robot apparatus according to claim 18, wherein the data estimator comprises a particle filter.

20. The moving robot apparatus according to claim 14, wherein the data estimator is configured to provide signals to the robot main body based on the estimated current direction so as to position the robot main body in a next direction.

21. A processor containing therein a method of controlling directional movement of a robotic apparatus, the method comprising:
receiving current data output by a sensor part of the robotic apparatus and related to a current direction of a main body of the robotic apparatus with respect to the earth's magnetic field;
determining whether the current data output from the sensor part satisfy a necessary condition, wherein the necessary condition is considered to be satisfied when the current data output from the sensor part are unaffected by an external magnetic field interference;
extracting a current sample value from a previous sample value obtained from the sensor part, wherein the previous sample value relates to a previous direction of the main body;
calculating a weight of the current data based on the current sample value, wherein a value of the weight depends on whether the necessary condition is satisfied by the current data; and
estimating the current direction of the main body of the robotic apparatus based on the extracted current sample value and the calculated weight, wherein the estimated current direction is at least one of stored in memory and included within the direction-related data provided in the main body.

22. The processor containing the method according to claim 21, wherein the estimating the current direction of the main body is performed by calculating a mean value of a probability distribution using the extracted current sample value and the calculated weight.

23. The processor containing the method according to claim 21, wherein the method further comprises:
providing signals to the main body of the robotic apparatus based on the estimated current direction so as to control directional movement of the main body.

24. A data storage medium containing program instructions, which, when executed by a processor in a robotic device, cause the processor to perform the following operations:
receive current data output by a sensor part of the robotic apparatus and related to a current direction of a main body of the robotic apparatus with respect to the earth's magnetic field;
determine whether the current data output from the sensor part satisfy a necessary condition, wherein the necessary condition is considered to be satisfied when the current data output from the sensor part are unaffected by an external magnetic field interference;

extract a current sample value from a previous sample value obtained from the sensor part, wherein the previous sample value relates to a previous direction of the main body;

calculate a weight of the current data based on the current sample value, wherein a value of the weight depends on whether the necessary condition is satisfied by the current data; and estimate the current direction of the main body of the robotic apparatus based on the extracted current sample value and, wherein the current estimated direction is at least one of stored in memory and included within the direction-related data provided to the main body.

* * * * *